(12) United States Patent
Venkatachalam et al.

(10) Patent No.: US 7,804,799 B2
(45) Date of Patent: Sep. 28, 2010

(54) UPLINK CONTENTION BASED ACCESS WITH QUICK ACCESS CHANNEL

(75) Inventors: Muthaiah Venkatachalam, Beaverton, OR (US); Xiangying Yang, Portland, OR (US); Sassan Ahmadi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 773 days.

(21) Appl. No.: 11/618,642

(22) Filed: Dec. 29, 2006

(65) Prior Publication Data

US 2008/0159334 A1 Jul. 3, 2008

(51) Int. Cl.
*H04W 4/00* (2009.01)
(52) U.S. Cl. ...................................... 370/329
(58) Field of Classification Search ............... 370/203, 370/208, 210, 329, 330, 335, 342
See application file for complete search history.

(56) References Cited

U.S. PATENT DOCUMENTS

| 6,967,936 | B1 | 11/2005 | Laroia et al. | |
|---|---|---|---|---|
| 7,310,303 | B2* | 12/2007 | Koo et al. | 370/206 |
| 2004/0252662 | A1 | 12/2004 | Cho | |
| 2005/0058058 | A1* | 3/2005 | Cho et al. | 370/208 |
| 2006/0105761 | A1 | 5/2006 | Walton et al. | |
| 2006/0239241 | A1* | 10/2006 | Eom et al. | 370/348 |
| 2006/0262750 | A1 | 11/2006 | Walton et al. | |
| 2008/0056193 | A1* | 3/2008 | Bourlas et al. | 370/331 |

FOREIGN PATENT DOCUMENTS

WO WO-2008082908 A1 7/2008

OTHER PUBLICATIONS

Kitroser et al, Bandwidth Request Using CDMA Codes in OFDMA(OFDM) Base PHY, IEEE, 8 pages, 2001.*
Kitroser et al, OFDM based Ranging Enhancement for the TG3 and TG4, IEEE, 11 pages, 2001.*
Kitroser et al, Proposed Enhancements to 802.16.1 MAC to Accommodate OFDMA PHY, IEEE, 13 pages, 2001.*
International Application Serial No. PCT/US2007/087498, International Search Report mailed May 14, 2008, P220, 6 pgs.
International Application Serial No. PCT/US2007/087498, Written Opinion mailed May 14, 2008, 6 pgs.

* cited by examiner

*Primary Examiner*—Frank Duong
(74) *Attorney, Agent, or Firm*—Schwegman, Lundberg & Woessner, P.A.

(57) ABSTRACT

Embodiments of a wireless communication system and methods allocating bandwidth are generally described herein. Other embodiments may be described and claimed. In some embodiments, an estimated requested bandwidth is included in a contention code. Additionally, a mobile station may reuse a previously used contention code that resulted in successful access to a base station. Further, a base station may determine or predict contention patterns and allocate codes based on the patterns.

18 Claims, 5 Drawing Sheets

UPLINK CONTENTION BASED ACCESS WITH QUICK ACCESS CHANNEL

TECHNICAL FIELD

Embodiments of the present invention pertain to wireless communications. Some embodiments pertain to a quick access channel for providing uplink contention based access.

BACKGROUND

Typically, broadband wireless communication standards beyond 3G, e.g. 3GPP LTE, IEEE 802.20, and IEEE 802.16e-2005 (mobile WiMAX) use uplink (UL) grant scheduling to exploit user diversity, to offer Quality of Service (QoS) support, and/or to provide good spectral efficiency. However UL grant scheduling generally is different from downlink (DL) scheduling in several aspects. First, the UL scheduler generally does not have the detailed buffer information ready as the DL scheduler does. Each mobile station (MS) therefore generally needs to update its buffer level at the base station (BS) for efficient scheduling.

Second, it is often the case that the UL buffer level update does not have the same detailed granularity as DL buffer information. The DL scheduler typically has all the information for each connection identifier (CID). However, for UL scheduling, maintaining such detailed buffer information would result in an increased load for the UL signaling channel and thus incur significant overhead.

Third, it is typical to arrange all UL grant request in a common contention channel shared by all users such that signaling overhead is incurred only when necessary, i.e., when a MS has data to send in a UL frame.

Furthermore, the UL contention-based access and resource allocation mechanisms in IEEE 802.16e-2005 based systems (mobile WiMAX) includes random access and bandwidth request stages that generally result in additional access latency. In the current IEEE 802.16e-2005 standard, the UL grant request happens first in the contention-based ranging channel. Additionally, upon a successful contention, BS allocates grant for a bandwidth request and then a bandwidth request is issued by MS to the BS. The contention-based UL bandwidth request may take four or possibly more frames, depending on the implementation and transceiver switching time. Thus there can be delay and potentially a large overhead associated with grant requests and bandwidth request, especially with respect to small grant requests.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
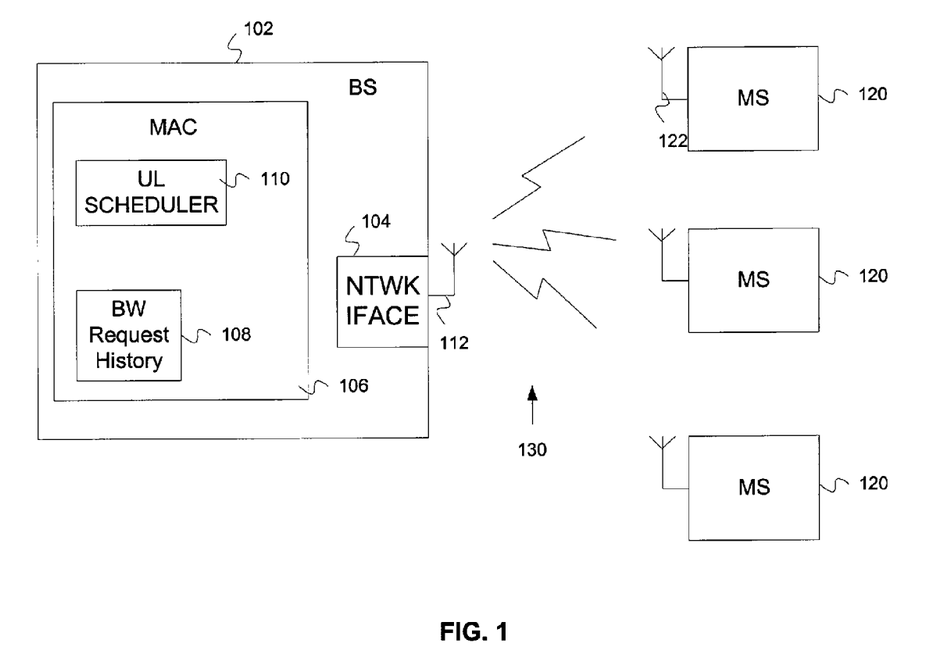
FIG. 1 illustrates a wireless network operating environment in accordance with some embodiments of the present invention.

FIG. 1 illustrates a wireless network operating environment 100 in accordance with some embodiments of the present invention. In some embodiments, network operating environment 100 includes a base station (BS) 102 and one or more mobile stations 120 that communicate with BS 102 through wireless network 130. Wireless network 130 may be any type of wireless network, including networks that comply with the Mobile WiMAX, IEEE 802.16e, IEEE 802.16m, 3GPP LTE, 3GPP2 AIE, IEEE 802.20 or other wireless network standards. In some orthogonal frequency division multiplexing (OFDM) and orthogonal frequency division multiple access (OFDMA) embodiments, base station 102 and mobile stations 120 may communicate using multicarrier communication signals comprising a plurality of subcarriers.

Base station 102 may include a MAC (Media Access and Control) component 106. MAC 106 may include an uplink scheduler 110 used to schedule resources (buffers, time slots, etc.) related to the uplink (e.g., MS to BS communication) for transmitting and receiving data through network interface 104. Additionally, MAC 106 in some embodiments may maintain a bandwidth (BW) request history 108. Bandwidth request history 108 may include data that associates a mobile station and a history of the mobile station's bandwidth requests over time. MAC 106 may include other elements (e.g., a DL scheduler) that are not necessary for an understanding of the embodiments and are therefore not shown to avoid obscuring the description of the embodiments.

In some embodiments, base station 102 may be a wireless access point (AP), such as a Worldwide Interoperability for Microwave Access (WiMax), or broadband communication station, although the scope of the invention is not limited in this respect as base station 102 may be part of almost any wireless communication device. In some embodiments, base station 102 may be a communication station, such as WiMax, or broadband wireless access (BWA) network communication station, although the scope of the invention is not limited in this respect.

Mobile stations (MS) 120 may be any type of device that desires to access a wireless network 130 through BS 102. In some embodiments, mobile station 120 may be part of a portable wireless communication device, such as personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, base station 102 may be referred to as a transmitting station and mobile station 120 may be referred to as a receiving station or subscribing station, however base station 102 may have receiving capability and mobile station 120 may include transmitting capability. Although base station 102 and mobile station 120 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of base station 102 and mobile station 120 may refer to one or more processes operating on one or more processing elements.

In some embodiments, base station 102 and mobile station 120 may communicate in accordance with specific communication standards, such as the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

Antennas 112 and antennas 122 may comprise directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some embodiments, antennas 112 and/or antennas 122 may be effectively separated to take advantage of spatial diversity and the different channel characteristics that may result between each of antennas 112 of base station 102 and each of antennas 122 of mobile station 120.

Figure 2:
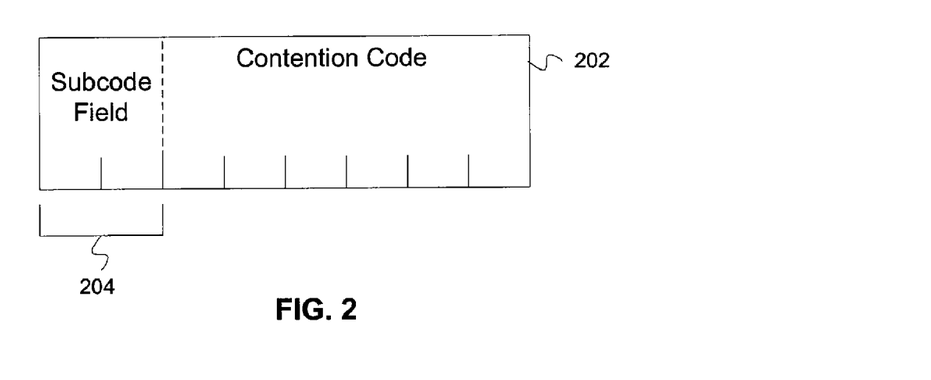
FIG. 2 illustrates contention code in accordance with some embodiments of the present invention.

FIG. 2 illustrates contention code 202 in accordance with some embodiments of the present invention. In some embodiments, contention code 202 is a CDMA (Code Division Multiple Access) contention code (also referred to as a random access code) having a code space C comprising 256 PN (pseudo-random number) codes with 8-bits of information from which ⅓ are designated for BW request, another ⅓ is considered for system re-entry, and the rest are reserved for system entry. For simplicity, an n=8-bit code space index, i.e., each code carries 8-bit of information will be discussed. Those of skill in the art will appreciate that other code sizes (and corresponding code spaces) may be used and are within the scope of the embodiments.

In some embodiments, contention code 202 includes a subcode field 204. Subcode field 204 may be used to classify and identify code subspaces that contain special meaning. For example, the subcode field 204 may be used to indicate a buffer level for a bandwidth request in a coarse granularity. In some embodiments, subcode field 204 may be two bits of contention code 202. Those of skill in the art will appreciate that more bits may be used in alternative embodiments. In the example of a subcode field that is two bits wide, four code sub-spaces $C_1$, $C_2$, $C_3$, and $C_4$ may be established, such that $$C_1 \cup C_2 \cup C_3 \cup C_4 = C.$$

where C is the code space defined by contention code 202.

In some embodiments, the subcode field 204 may be used to indicate estimates on the MS buffer level as follows (where $N_1 < N_2 < N_3 < N_4$):

TABLE 1

| Sub Code space | Buffer level indication |
| --- | --- |
| C1 (00xx xxxx) | $(0, N_1]$ |
| C2 (01xx xxxx) | $(N_1, N_2]$ |
| C3 (10xx xxxx) | $(N_2, N_3]$ |
| C4 (11xx xxxx) | $(N_3, N_4]$, an additional BW request PDU (Protocol Data Unit) may be used. |

Thus in the example provided above, a contention code having a '00' value in subcode field 204 indicates that an estimate of the bandwidth required by a mobile station is between 0 and $N_1$ (inclusive) bytes. Similarly, a contention code having a '01' value in subcode field 204 indicates that an estimate of the required bandwidth is between $N_1$ and $N_2$ (inclusive). Those of skill in the art will appreciate that other code spaces may be established using more bits for subcode field 204.

Varying embodiments may use various values for $N_i$, where 'i' is the number of subcode spaces that may be created in accordance with the size of the subcode field 204. The assignment of values for $N_1$ to $N_i$ may take into account various considerations when determining the code space assignments that result from the values of $N_i$. For example, it may be desirable to assign $N_1$ to $N_i$ in a non-linear fashion, i.e., in an exponential manner. Doing so may provide better resolution for small requests and/or improve the efficiency by reducing unnecessary resource grants. Thus it may be desirable to consider the statistical distributions of bandwidth requests and frequency and significance of applications when designing values for $N_i$.

In addition, in some embodiments, the $N_1$ to $N_{i-1}$ range may be considered close upper bounds for the bandwidth estimate in order to avoid the overhead of an additional BW request PDU for small grant requests.

Further, it may be desirable to match the cardinality of each code space with the empirical distribution of typical BW request patterns. For instance, using the example illustrated by FIG. 2 and Table 1, if there is a high probability that many requests fall into the range $[N_1, N_2]$, then code space $C_2$ should be large. Again the desired cardinality may be determined with the aid of a statistical study of BW request distributions.

In some embodiments, the definitions of $N_1$-$N_i$ may be fixed in view of the fact that the real life network environment is not likely to change quickly. In alternative embodiments, one or more of N1-$N_i$ may be dynamically changed. The change may be communicated through messages sent to the MSs that are in communication with the BS. For example, in some embodiments, the BS may periodically broadcast the mapping information in MAP components of a frame.

In some embodiments, specific codes may be reserved for fixed size bandwidth requests. For example, all codes in '0000 xxxx' may define a bandwidth request size useful for quick-ARQ feedback packets. Similarly all codes in '0001 xxxx' may be used for 64-Byte TCP signaling messages.

Figure 3:
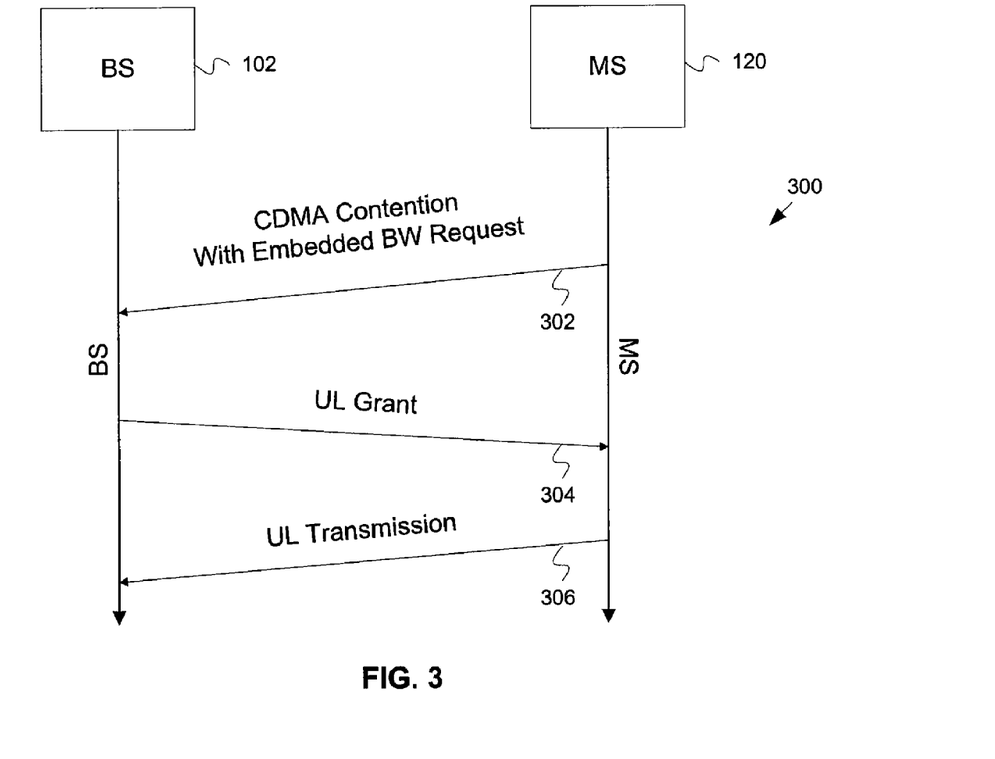
FIG. 3 is a message sequence illustrating a method for requesting resources in a wireless network in accordance with some embodiments of the present invention.

FIG. 3 is a message sequence illustrating a method for requesting resources in a wireless network in accordance with some embodiments of the present invention. In some embodiments, the method begins at block 302, where a base station 102 receives from a mobile station 120 a contention code with an embedded subcode field indicating a bandwidth request. The base station decodes the subcode field to determine the associated range for the bandwidth request and schedules the appropriate resources (buffer sizes, time slots etc.) that may be used in fulfilling the bandwidth request.

At block 304, base station 102 transmits an uplink grant message to mobile station 120 informing the mobile station of the granted bandwidth.

At block 306, mobile station may then perform uplink transmissions to base station 120.

As can be seen from the above, a BS may allocate the estimated BW required without polling a BW request packet and thus may reduce access latency by eliminating or reducing the delay associated with the BW request mechanisms of previous systems.

A generic MAC ID-based code structure is further described that may be configured to convey various information during contention-based system re-entry.

In some embodiments, BS 102 and Mobile Station 120 use a generic codeword comprising an optional synchronization, a data/control/signaling field, and an optional CRC field. The lengths of these fields may vary depending on the deployment scenarios. Additionally, the length of the synchronization field or CRC field or both may be set to zero depending on the bandwidth of the random access channel.

The generic access code may be covered by a unique access code that may be assigned to the MS following an initial system entry. The unique access code may be derived from the MAC-ID of the MS or may be derived from any orthogonal or quasi-orthogonal sequences. The MAC-ID based covers may be used to uniquely separate/identify the mobile terminals to allow faster system re-entry and BW requests. As a result, in some embodiments, a MAC header is not needed since the cover will uniquely identify the MS.

The contention code and subcode field and the methods described above may be used to define a novel transport/physical channel, herein called a quick access channel (QACH), where the mobile stations may use during system re-entry to not only request access but also request an estimate of required physical resources (BW request). The BW request may be signaled through the data/control/signaling field using appropriate number of bits. The QACH channel allows transport of low-rate data and/or control/signaling messages/information (BW-REQ) in the uplink during system re-entry. The capability to transport low-rate data may be beneficial for delay-sensitive applications such as VoIP and interactive gaming. The optional synchronization field (SYNC field) may contain QACH synchronization sequence.

Figure 4:
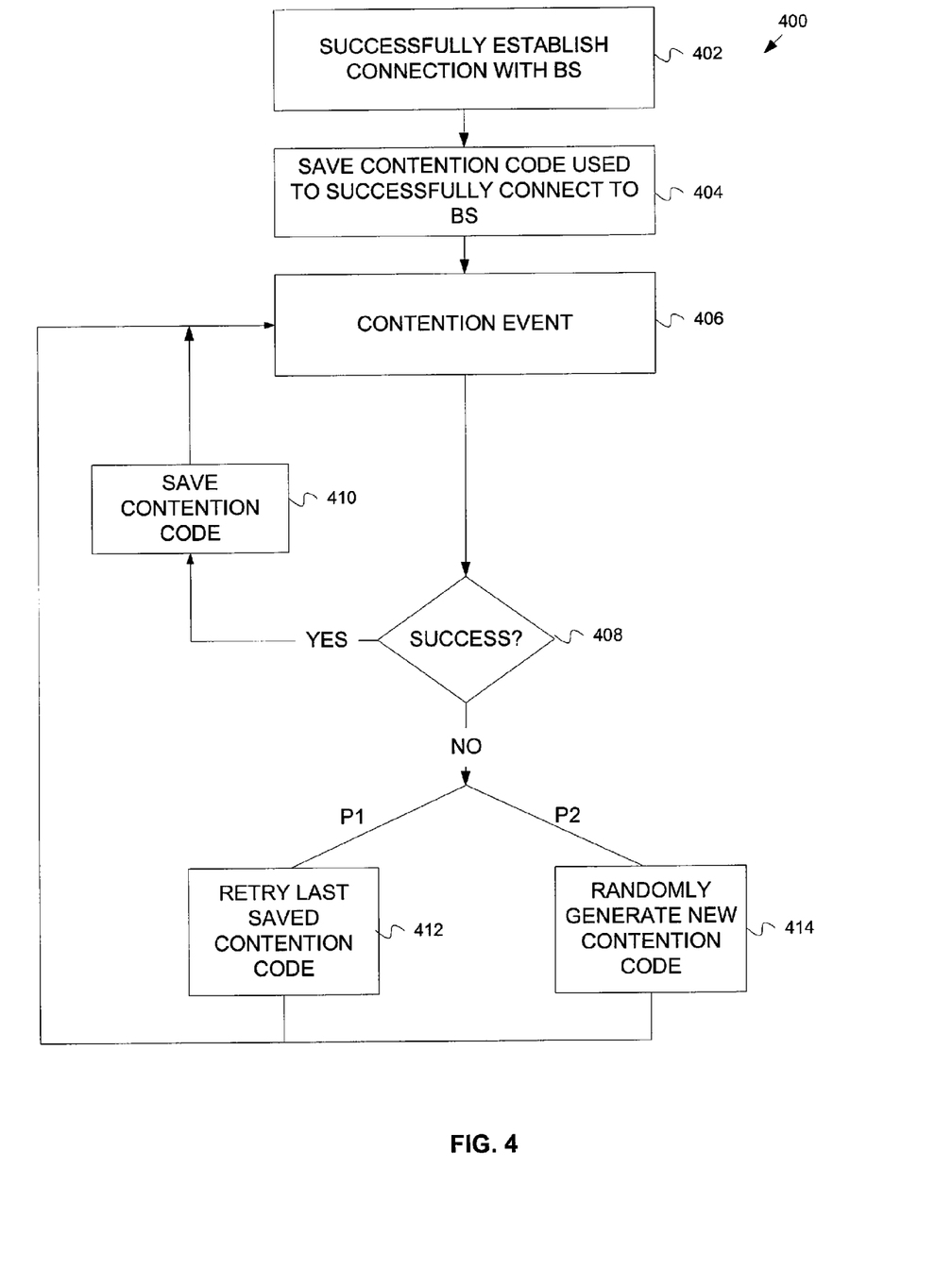
FIG. 4 is a flowchart illustrating a method for sticky contention in accordance with some embodiments of the present invention.

FIG. 4 is a flowchart illustrating a method for sticky contention in accordance with some embodiments of the present invention. In general, sticky contention may be self-managed at each MS. It is essentially a non-independent contention procedure based on previous contention history. The method begins at block 402, where a mobile station successfully establishes a connection with a base station using a contention code. At block 404, the mobile station 120 saves the contention code that was used to successfully establish access to the base station 102.

At block 406, a new contention event occurs. The new contention event may be a system re-entry, a new application on mobile station 120, or any other event that causes a new contention. The mobile station 120 reuses the contention code saved at block 404 (or block 410) to attempt to establish or reestablish access to base station 102.

At block 408, a check is made to determine if the contention code used was successful in establishing access to base station 102.

At block 410, if the attempt is successful the mobile station 120 saves the contention code used and continues to communicate with base station 102. Control then returns to block 406 to await the next contention event.

If at block 408 the attempt to establish or reestablish access to base station 102 fails, for example if there is a collision or no response for base station 102, then in some embodiments the mobile station 120 performs the actions at blocks 412 and 414 with probabilities P1 and P2 respectively. At block 412, the mobile station reattempts to access the base station using the last successful contention code saved at block 404. At block 414, the mobile station randomly generates a new code for use in attempting to establish or reestablish access to base station 102. The method then returns to block 406 to use the saved code or the newly generated code for the next contention event.

In some embodiments, P1 and P2 may be equally probable, that is, P1=0.5 and P2=0.5. However, the embodiments are not limited to any particular probability values for P1 and P2. In alternative embodiments, P1 may equal zero, resulting in the mobile station making one attempt to reuse a previously successful contention code. If that attempt fails, a new randomly generated contention code may be selected.

Performance may be improved in some embodiments because when the system is not overloaded, contending mobile stations are adaptively assigned a reserved slot due to the reuse of the previous contention code and thus the contention level is effectively reduced. On the other hand, when the system is indeed overloaded, it will behave like random contention, i.e., no worse than random contention in any case.

Figure 5A:
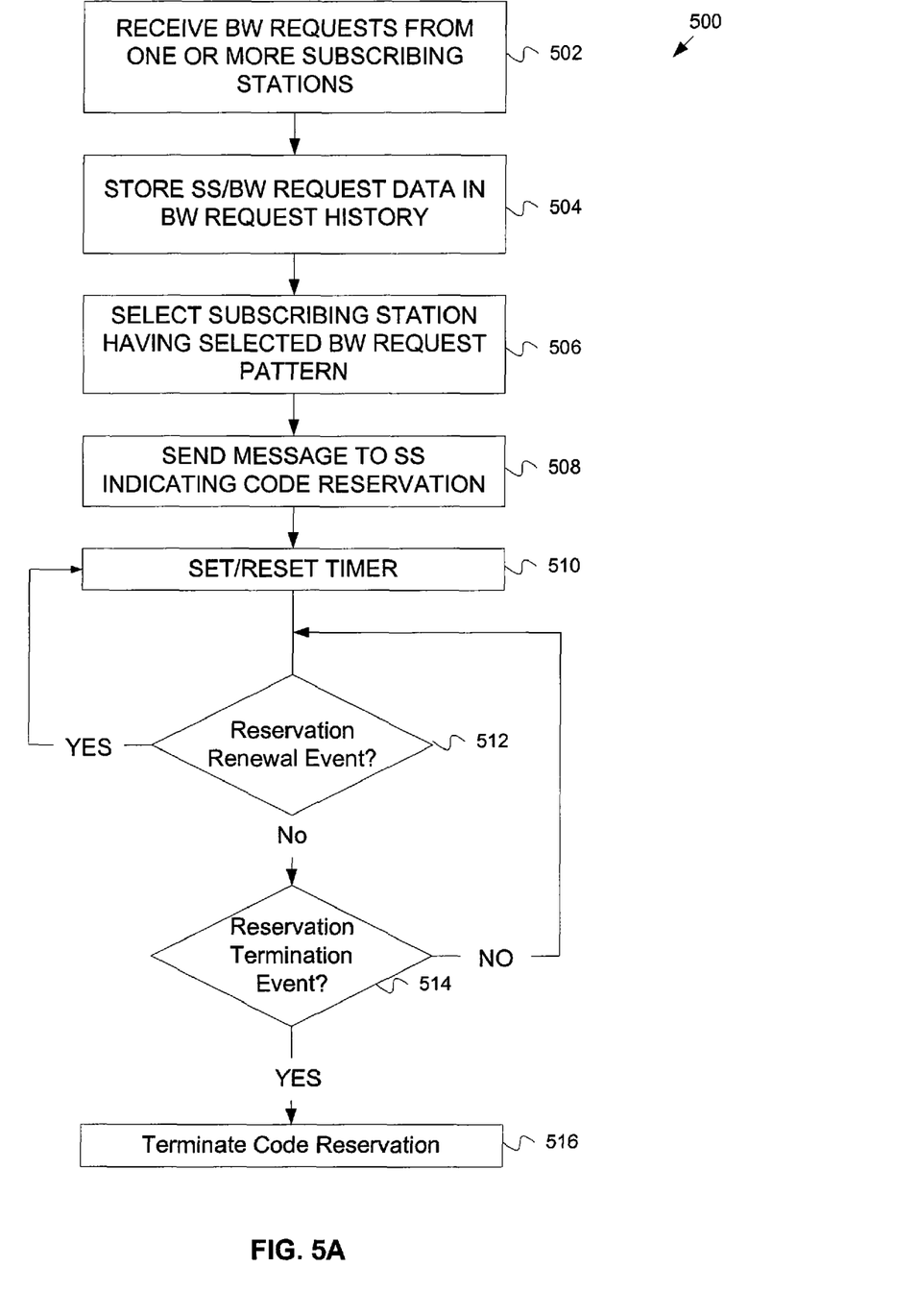
FIGS. 5A and 5B are flowcharts illustrating methods for reserving contention codes in accordance with various embodiments of the present invention.
Figure 5B:
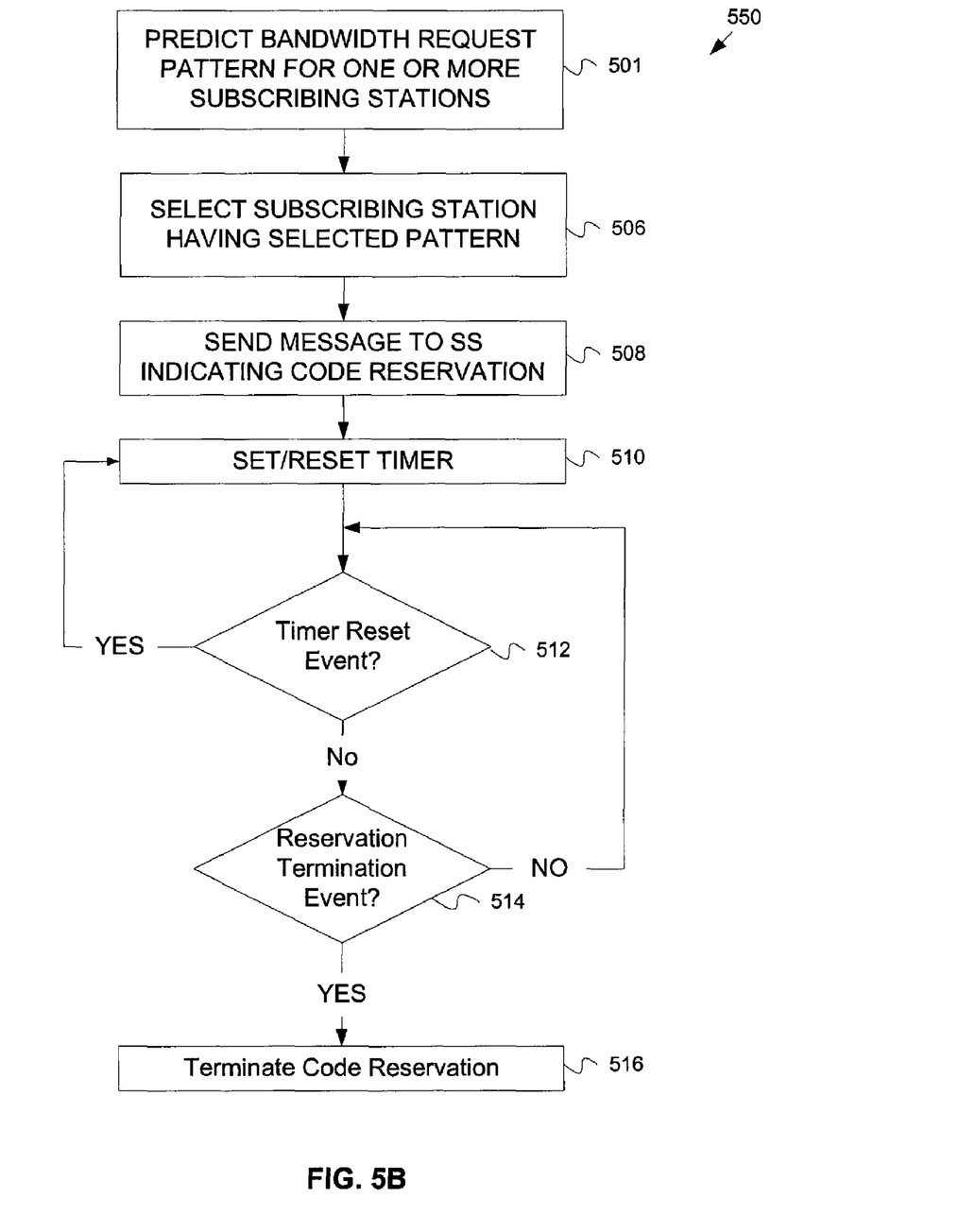

FIGS. 5A and 5B are flowcharts illustrating methods for reserving contention codes in accordance with various embodiments of the present invention. In general terms, the adaptive code reservation illustrated in FIGS. 5A and 5B has some similarity to the 'sticky contention' described above with reference to FIG. 4, but it is managed by the BS 102. It may be viewed as code space partition and reservation with centralized management at BS 102.

FIG. 5A illustrates a method 500 for reserving contention codes in accordance with various embodiments of the present invention where contention patterns are analyzed. The method begins at block 502 where a base station 102 receives bandwidth requests from one or more mobile stations 120 over a period of time. At block 504, the bandwidth requests are saved by base station 102 in bandwidth request history data 108 (FIG. 1). The contention history data in some embodiments includes the MS making the request along with the requested bandwidth size.

A contention pattern may be a set of one or more contention-based accesses that exhibit similar characteristics, such as requested bandwidth. Each contention pattern may be assigned a unique code. In some embodiments, because legacy mobile stations may randomly choose a code from the entire code space, it may be desirable to physically (time/frequency or code based) separate such "quick-access ranging channel with code reservation" from regular ranging channel to avoid collision.

At block 506, a mobile station 120 having a particular contention pattern may be selected. For example, a mobile station 120 having a contention pattern indicating active reuse of a particular bandwidth size may be identified.

At block 508 base station 102 may send the selected mobile station a message indicating that the base station 102 has reserved one or more codes, where each code represents an estimated bandwidth request amount. One code may be sufficient in the case of a mobile station executing an application with a simple pattern or history of bandwidth requests. For example, a mobile station that may be executing a gaming session with frequent TCP packets in the uplink having a size around or below 100 bytes may result in a particular contention code being reserved by the base station for use by the mobile station for the TCP packets.

At block 510, a timer is set (or reset) to establish an expiration for the reserved code or codes. In some embodiments, the expiration period is self-clocked by both the base station and the mobile station.

At block 512, a reservation renewal event may occur. An example of a reservation renewal event is a successful bandwidth request on behalf of the mobile station using the reserved code or codes. In this case, the timer may be reset. In some embodiments, timers are reset on both the base station and the mobile station.

At block 514, the base station determines if a reservation termination event has occurred. One example of a reservation termination event is the expiration of the reservation timer. A further example is if the base stations returns a bandwidth request grant that is different from the request associated with the reserved code. For example, if the BS returns a 6-byte bandwidth request grant instead of a 100-byte grant as negotiated for the reserved access code, the MS should assume the reservation has been terminated and no longer exists.

At block 516, the reservation codes are considered terminated. The codes may be recycled for future use when contention patterns are identified on particular mobile stations.

FIG. 5B illustrates a method 550 for reserving contention codes in accordance with various embodiments of the present invention where contention patterns are predicted. Method 550 is similar to method 500. The method begins at block 501 where a base station 102 predicts bandwidth requests based on the applications running on a mobile station 120. In some embodiments, the applications may be determined by examining the data packet types generated by the application. A pattern of bandwidth requests may be predicted by BS 102. The predicted pattern may be used instead of, or in addition to the analyzed pattern used in method 500.

Blocks 506-516 operate the same as discussed above with respect to FIG. 5A.

As an example of the operation of methods 500 and 550 of FIGS. 5A and 5B, consider a network that supports 256 codes and reserves 128 codes out of the entire code space. Assume that there are 128 ongoing flows frequently requesting bandwidth. On average, there is a probability of $1-(255/256)^{127}=0.4$ that a collision may happen for a typical flow's BW request. With code reservation, each flow may be assigned its own code and collisions will be reduced or eliminated. Note that collisions may lead to two MSs sending BW requests in the same slot. The result is the same as the convergence point of 'sticky contention' described above with reference to FIG. 4. However, when reserved codes are managed by a BS, the BS can arrange more flexibility in contention management. For example, in some embodiments the BS may assign some MSs to use reserved codes and others to continue regular contention. The network performance gains may be influenced by the degree to which contention patterns are very heterogeneous or where contention requests belongs to different QoS classes.

It should be noted that the above described systems and methods may be combined or may be implemented separately from one another. For example, the sticky contention method illustrated in FIG. 4 may be used with or without a contention code having a subcode field. The MAC-ID based cover for the codeword may be used with or without the contention code that includes a subcode indicating an uplink resource request.

The systems and methods above may apply to many network environments and applications. Examples of applications that may benefit from quick UL access and resource allocation described above include but are not limited to the following:

1. TCP ACK/SYN messages: These are relatively small packets. But their delivery contributes to the overall round trip delay (RTT) on which TCP performance heavily relies. If the system can offer fast (with potentially deterministic delay) TCP signaling message delivery, then up to half of the jitter source in TCP RTT may be reduced or eliminated. Note these TCP signaling messages are of fixed size.
2. ARQ NACK: It is desirable that ARQ NACK packets should be delivered as fast as possible to correct PHY layer H-ARQ feedback errors. If designed properly, these ARQ NACK messages may be designed to have a fixed size that would benefit from the systems and methods described above.
3. Initial ranging during network (re)entry: Typically a MS will request bandwidth after finishing network entry. Such operations may be quite frequent when MS switch from idle/sleep to active mode, which adds signaling overhead to the network and leads to slow call initialization for clients.
4. Push over Cellular (PoC) service (also known as Push to Talk): A PoC one-way conversation application typically exhibits long-term (in seconds) traffic on-off periods. Initial delay may affect the quality of such service.
5. Gaming application: Gaming applications typically make bursty bandwidth requests that may happen over a long session. Within each busy period, the bandwidth requests are frequent/periodical and with similar requested resource size.
6. Voice over IP (VoIP): VoIP is delay sensitive service which involves transmission of small voice packets continuously during active speech periods and intermittently during inactive periods. The delay sensitive and bursty characteristics of voice services require enhanced re-entry mechanisms that result in shorter access times in the UL and shorter end-to-end delay.

Various embodiments provide a method for achieving relatively fast UL bandwidth request for fixed-size and small packets. The systems and methods of the embodiments may be beneficial for system performance. The systems and methods provide efficiency by reducing signaling overhead by avoiding using UL resources if the size information may be estimated or inferred by a BS without using a conventional BW request packet.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or nonvolatile memory or a combination thereof.

Some embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for execution by one or more processors, the method comprising:
    determining by the one or more processors a plurality of subcode spaces within a contention code space, the subcode spaces having a subcode space identifier;
    receiving a contention code, the contention code including the subcode space identifier;
    allocating by the one or more processors an uplink resource for a data stream in accordance with the subcode space identifier;
    saving the contention code that resulted in successful access to a base station; and
    reusing the contention code for a subsequent contention-based access to the base station.

2. The method of claim 1, wherein the plurality of subcode spaces include four subcode spaces and wherein the subcode space identifier comprise two bits of the contention code.

3. The method of claim 1, wherein the uplink resource includes uplink bandwidth.

4. The method of claim 3, wherein the subcode spaces are associated with an uplink bandwidth amount and wherein the uplink bandwidth amounts are non-linear.

5. The method of claim 1, further comprising:
    if reusing the contention code was not successful then retrying the contention code based on a first probability or generating a new contention code based on a second probability.

6. A method for execution by one or more processors, the method comprising:
    determining by the one or more processors a contention pattern for a mobile station, the contention pattern based on a history of bandwidth requests for the mobile station;
    reserving one or more contention codes, each of the contention codes associated with a different bandwidth request; and
    notifying the mobile station of the one or more reserved contention codes.

7. The method of claim 6, wherein determining the contention pattern includes storing bandwidth requests by the mobile station and wherein the contention pattern is determined from the stored bandwidth requests.

8. The method of claim 6, wherein determining the contention pattern includes:
    determining an application executed by the mobile station; and
    predicting the contention pattern based on the application.

9. The method of claim 6, further comprising determining an access code to assign to a mobile station for identifying the mobile station, the access code derived from the MAC (Media Access and Control) identifier for the mobile station.

10. An apparatus comprising:
    a MAC component to receive a contention code, the contention code having a subcode;
    a bandwidth request history having a plurality of bandwidth requests and associated mobile station identifiers; and
    an uplink scheduler to schedule an uplink resource based on the subcode;
    wherein the MAC component is operable to identify a contention pattern from the bandwidth request history and to reserve one or more contention codes to associate with the contention pattern.

11. The apparatus of claim 10, wherein the uplink resource includes a bandwidth allocation.

12. The apparatus of claim 10, wherein the MAC component is operable to predict a contention pattern and to reserve one or more contention codes to associate with the contention pattern.

13. The apparatus of claim 12, wherein the MAC component is operable to predict the contention pattern based on an application executing on a mobile station.

14. A machine-readable non-transitory medium having stored thereon machine executable instructions for causing one or more processors to perform a method, the method comprising:
    determining a plurality of subcode spaces within a contention code space, the subcode spaces having a subcode space identifier;
    receiving a contention code, the contention code including the subcode space identifier;
    allocating an uplink resource for a data stream in accordance with the subcode space identifier;
    saving the contention code that resulted in successful access to a base station; and
    reusing the contention code for a subsequent contention-based access to the base station.

15. The machine-readable medium of claim 14, wherein the plurality of subcode spaces include four subcode spaces and wherein subcode space identifier comprise two bits of the contention code.

16. The machine-readable medium of claim 14, wherein the uplink resource includes uplink bandwidth.

17. The machine-readable medium of claim 14, wherein the method further comprises:
    determining a contention pattern for a mobile station;
    reserving one or more contention codes; and
    notifying the mobile station of the one or more reserved contention codes.

18. The machine-readable medium of claim 17, wherein determining a contention pattern includes storing bandwidth requests by the mobile station and wherein the contention pattern is determined from the stored bandwidth requests.

* * * * *